United States Patent
Kato et al.

(10) Patent No.: US 7,224,663 B2
(45) Date of Patent: May 29, 2007

(54) OPTICAL RECORDING MEDIUM, METHOD OF RECORDING INFORMATION TO AN OPTICAL RECORDING MEDIUM, AND INFORMATION RECORDING APPARATUS

(75) Inventors: Tatsuya Kato, Tokyo (JP); Hiroshi Shingai, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 497 days.

(21) Appl. No.: 10/489,118

(22) PCT Filed: Sep. 5, 2002

(86) PCT No.: PCT/JP02/09071

§ 371 (c)(1),
(2), (4) Date: Mar. 10, 2004

(87) PCT Pub. No.: WO03/025916

PCT Pub. Date: Mar. 27, 2003

(65) Prior Publication Data

US 2004/0233813 A1 Nov. 25, 2004

(30) Foreign Application Priority Data

Sep. 11, 2001 (JP) ............................ 2001-275026

(51) Int. Cl.
*G11B 7/24* (2006.01)
*G11B 5/09* (2006.01)

(52) U.S. Cl. ................................ 369/275.1; 369/59.11; 369/59.19

(58) Field of Classification Search .................... None
See application file for complete search history.

(56) References Cited

FOREIGN PATENT DOCUMENTS

| JP | 8287465 | 11/1996 |
|---|---|---|
| JP | 2001-176072 | 6/2001 |
| JP | 2001-331936 | 11/2001 |

*Primary Examiner*—Muhammad Edun
(74) *Attorney, Agent, or Firm*—Seed IP Law Group PLLC (57) ABSTRACT

It is an object of the present invention to provide a method of recording information to an optical recording medium that is suited to achieving high data transfer rates.

The optical recording medium according to the present invention comprises a method of recording information to an optical recording medium where information is recorded by forming a plurality of recording marks selected from a group consisting of several types of recording marks each with different lengths, wherein: the cooling interval when forming the shortest recording mark contained within said group is set shorter than the cooling interval when forming the other recording marks contained in the group. Thus, even in the case that one clock period (T) is shortened to achieve high transfer rates, a high erase efficiency can be maintained when overwriting data.

14 Claims, 9 Drawing Sheets

OPTICAL RECORDING MEDIUM, METHOD OF RECORDING INFORMATION TO AN OPTICAL RECORDING MEDIUM, AND INFORMATION RECORDING APPARATUS

BACKGROUND OF THE INVENTION

The present invention relates to an optical recording medium, a method of recording information to an optical recording medium and an information recording apparatus, and particularly to an optical recording medium, a method of recording information to an optical recording medium and an information recording apparatus that is suited to achieving high data transfer rates.

DESCRIPTION OF THE PRIOR ART

Optical recording media typified by the CD and the DVD have been widely used as recording media for recording digital data, and a widely used data recording format is a format wherein the lengths of recording marks along the track are modulated depending on the data to be recorded.

When such a recording format is used, while reading data, a laser beam set to the playback power level is shined along the tracks of the optical recording medium and the reflected light is detected to read the information contained in the recording marks. In addition, while writing data, a laser beam set to the recording power level is shined along the tracks of the optical recording medium to form recording marks having the stipulated lengths. For example, in a DVD-RW which is one type of optical recording medium whose data is user-rewritable, recording marks of lengths corresponding to 3 T to 11T (where T is one clock cycle) are used to perform the recording of data.

Here, at the time of recording data to optical recording media, rather than illuminating the, optical recording medium with a laser beam having the same pulse width as the time corresponding to the length of the recording marks, typically a laser beam consisting of a number of pulse trains determined based on the type of recording mark to be formed is shined onto the optical recording medium to form recording marks of the stipulated length.

For example, when recording data onto a DVD-RW as described above, a number of pulses equal to n−1 or n−2 (where n is the type of recording mark, taking a value of either 3 to 11 or 14) is continuously shined, and thus one of the recording marks having a length corresponding to 3T to 11T or 14T is formed. Accordingly, in the case of n−2, one pulse is used to form a recording mark with a length corresponding to 3T, while nine pulses are used to form a recording mark with a length corresponding to 11T. In addition, in the case of n−1, two pulses are used to form a recording mark with a length corresponding to 3T, while ten pulses are used to form a recording mark with a length corresponding to 11T.

In recent years, it has become strongly desirable to achieve further increases in the data transfer rate with respect to optical recording media and in order to achieve this, it is effective to increase the linear speed in recording/playback and to this end the clock frequency must be increased.

However, increasing the clock frequency makes the period of one clock pulse (T) shorter, so the time to form each recording mark decreases proportionally. The recording marks are typically formed by heating and subsequent rapid cooling by means of a laser beam shined during recording, so as the time required to form each recording mark becomes shorter, it becomes extremely difficult to set the heating interval and cooling interval appropriately. This problem becomes particularly marked in the formation of recording marks with a short mark length.

SUMMARY OF THE INVENTION

According to research conducted by the present inventors, taking into account a format efficiency of 80%, when a data transfer rate of 100 Mbps or greater, or in particular when a data transfer rate of 140 Mbps or greater is achieved, the pulses of the laser beam used in forming the shortest recording mark become extremely short, so if the cooling time at the time of forming the shortest recording mark is set to the same time as the cooling time when forming the other recording marks, a greater than necessary cooling effect was found to be obtained. As a result, when performing a direct overwrite (overwriting a new recording mark directly above a previously written recording mark), there is a risk of the old recording mark not being adequately erased so that overwriting is impossible.

Accordingly, an object of the present invention is to provide an improved method of recording information to an optical recording medium and an improved information recording method.

In addition, another object of the present invention is to provide a method of recording information to an optical recording medium and an information recording apparatus that are suited to achieving high data transfer rates.

In addition, a still other object of the present invention is to provide an optical recording medium that can be recorded at high data transfer rates.

In addition, a still other object of the present invention is to provide a method of recording information to an optical recording medium and an information recording apparatus that can adequately erase old recorded data when overwriting a previously written recording mark with a new recording mark.

These objects of the present invention are achieved by an optical recording medium comprising at least a recording layer where information is recorded by forming a plurality of recording marks selected from a group consisting of several types of recording marks each with different lengths, wherein: the optical recording medium comprises setting information required to perform the recording of said information with the cooling interval when forming the shortest recording mark contained within said group set shorter than the cooling interval when forming the other recording marks.

With the present invention, the cooling interval when forming the shortest recording mark is set shorter than the cooling interval when forming the other recording marks, so even in the case that the clock period (T) is shortened in order to achieve high data transfer rates, it is still possible to maintain a high erase efficiency when overwriting data.

In a preferred embodiment of the present invention, the optical recording medium further comprises setting information required to perform the recording of said information with the cooling interval when forming said other recording marks set to be substantially constant for each recording mark.

These objects of the present invention are also achieved by a method of recording information to an optical recording medium where information is recorded by forming a plurality of recording marks selected from a group consisting of several types of recording marks each with different lengths, wherein: the cooling interval when forming the shortest recording mark contained within said group is set shorter than the cooling interval when forming the other recording marks contained in said group.

With the present invention, the cooling interval when forming the shortest recording mark is set shorter than the cooling interval when forming the other recording marks, so even in the case that the clock period (T) is shortened in order to achieve high data transfer rates, it is still possible to maintain a high erase efficiency when overwriting data.

In a preferred embodiment of the present invention, the heating interval when forming said shortest recording mark is set shorter than the heating interval when forming said other recording marks.

In a further preferred embodiment of the present invention, the pulse interval is set substantially constant in the formation of all recording marks wherein the number of pulses used is 2 or greater.

These objects of the present invention are also achieved by an information recording apparatus that records information by forming on the optical recording medium a plurality of recording marks selected from a group consisting of several types of recording marks with different lengths, wherein said information recording apparatus comprises: means of forming the shortest recording mark contained in said group by setting the length of the cooling interval to a first time, and means of forming the other recording marks contained in said group by setting the length of the cooling interval to a second time longer than said first time.

DESCRIPTION OF THE PREFERRED EMBODIMENTS

Preferred embodiments of the present invention will be explained in detail with reference to the drawings.

Figure 1:
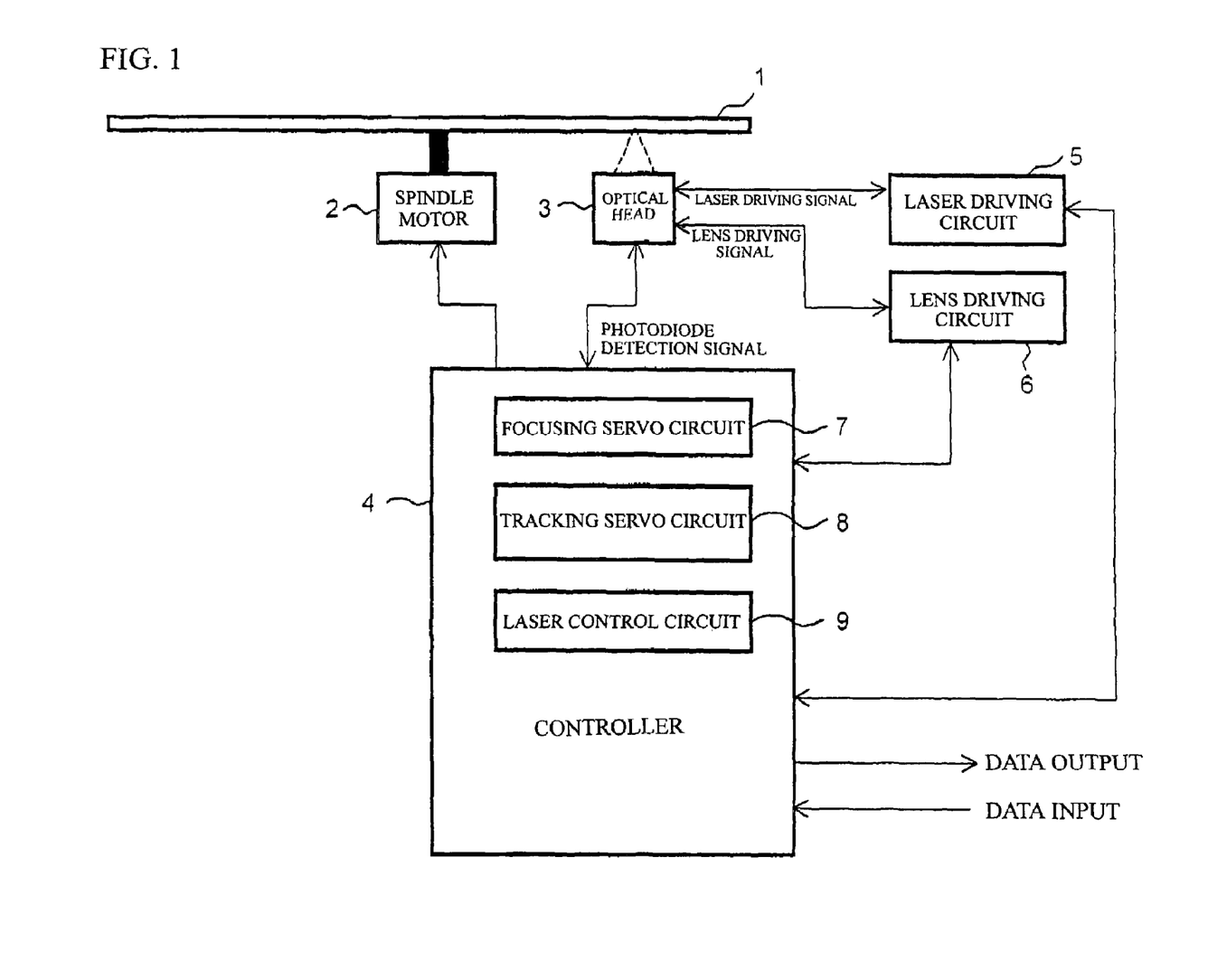
FIG. 1 is a schematic drawing of the major components of an information recording apparatus according to a preferred embodiment of the present invention.

FIG. 1 is a schematic drawing of the major components of an information recording apparatus according to a preferred embodiment of the present invention.

As shown in FIG. 1, the information recording apparatus according to this embodiment is equipped with a spindle motor 2 for rotating an optical recording medium 1, an optical head 3 for shining a laser beam onto the optical recording medium 1, a controller 4 for controlling the operation of the spindle motor 2 and the optical head 3, a laser driving circuit 5 that supplies a laser driving signal to the optical head 3, and a lens driving circuit 6 that supplies a lens driving signal to the optical head 3.

Moreover, as shown in FIG. 1, the controller 4 includes a focusing servo circuit 7, a tracking servo circuit 8, and a laser control circuit 9. When the focusing servo circuit 7 is activated, the focus is aligned to the recording surface of the rotating optical recording medium 1, and when the tracking servo circuit 8 is activated, the spot of the laser beam begins to automatically track the eccentric signal track of the optical recording medium 1. The focusing servo circuit 7 and tracking servo circuit 8 are provided with an auto gain control function for automatically adjusting the focusing gain and an auto gain control function for automatically adjusting the tracking gain, respectively. In addition, the laser control circuit 9 is a circuit that generates the laser driving signal supplied by the laser driving circuit 5, and generates an appropriate laser driving signal based on recording condition setting information recorded on the optical recording medium 1. Here, the "recording condition setting information" refers to various conditions required for recording data on the optical recording medium 1, e.g., information used in order to determine the power of the laser beam to be shined while recording, the pulse train pattern to be described later, and the like. The recording condition setting information may include not only various conditions required to record data indicated specifically, but also the recording conditions may be identified by specifying one of several conditions stored in advance within the information recording apparatus.

Note that the focusing servo circuit 7, tracking servo circuit 8 and laser control circuit 9 need not be circuits incorporated in the controller 4 but can instead be components separate of the controller 4. Moreover, they need not be physical circuits but can instead be accomplished by software programs executed in the controller 4.

Here follows a description of the structure of an optical recording medium according to the present embodiment.

Figure 2:
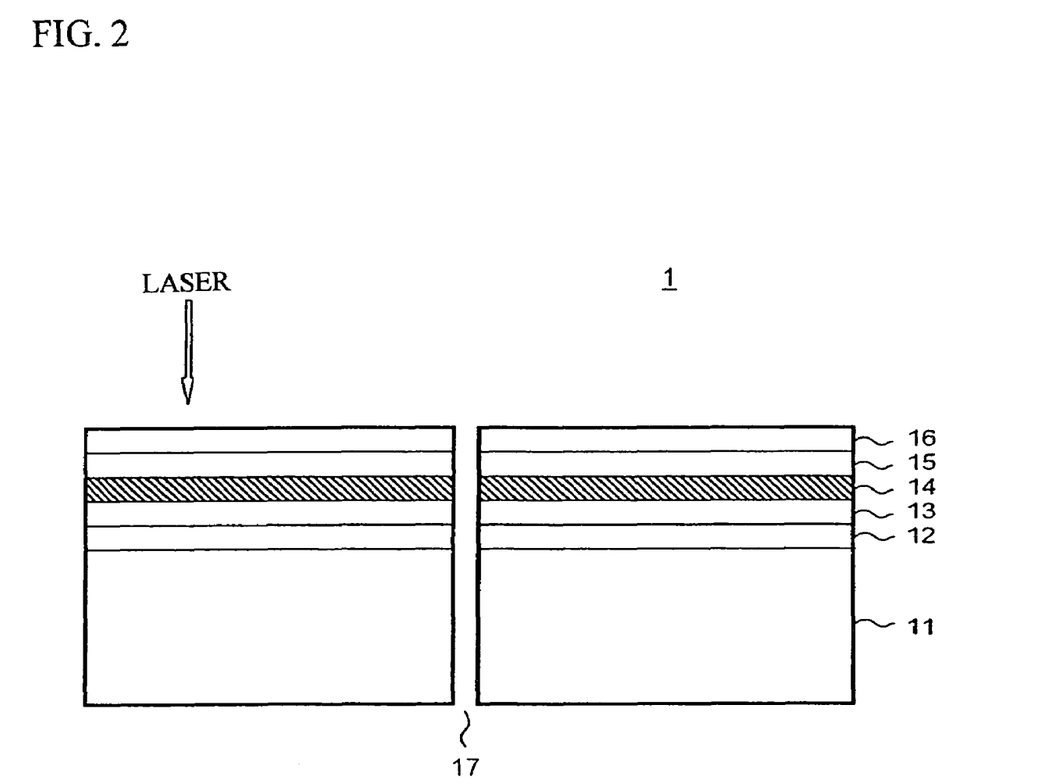
FIG. 2 is a schematic cross section illustrating the structure of an optical recording medium 1 according to a preferred embodiment of the present invention.

FIG. 2 is a schematic cross section illustrating the structure of an optical recording medium 1 according to the present embodiment.

As shown in FIG. 2, the optical recording medium 1 consists of a substrate 11 with a thickness of approximately 1.1 mm, a reflective layer 12 with a thickness of approximately 10–300 nm, a second dielectric layer 13 with a thickness of approximately 10–50 nm, a recording layer 14 with a thickness of approximately 5–30 nm, a first dielectric layer 15 with a thickness of approximately 30–300 nm, and a light transmission layer 16 with a thickness of approximately 50–150 μm. In addition, a hole 17 is provided in the center of the optical recording medium 1. When recording data onto an optical recording medium with such a structure, the working distance (the distance between the objective lens used to focus the laser beam, which is a part of the optical head 3, and the surface of the optical recording medium 1) is set extremely short (e.g., approximately 80–150 μm), and thus a beam spot diameter much smaller than that in the past is achieved. With an optical recording medium 1 having such a structure, it is possible to achieve a high data capacity and a high data transfer rate. In addition, the recording condition setting information described above is recorded on the optical recording medium 1. The recording condition setting information may be recorded as a wobble signal or pre-pits, or it may be recorded as data in the recording layer 14.

The recording layer 14 of the optical recording medium 1 is made up of a phase-change film that has a different reflectance in the crystalline phase than in the amorphous phase, and this property is utilized to record data. Specifically, the unrecorded regions of the recording layer 14 are crystalline so their reflectance may be 20%, for example. To record some sort of data in such unrecorded regions, certain portions of the recording layer 14 depending on the data to be recorded are heated to a temperature in excess of the melting point and then rapidly cooled to change them into the amorphous state. The reflectance of the amorphous portions may become 7%, for example, assuming the state in which the stipulated data is recorded. Moreover, to overwrite data once it is recorded, the portions of the recording layer 14 that are recorded with data to be overwritten are heated to either above the crystallization temperature or above the melting point depending on the data to be recorded, thus changing it into the crystalline or amorphous state.

In this case, taking $P_w$ to be the write power level of the laser beam shined in order to melt the recording layer 14, $P_b$ to be the base power of the laser beam shined when cooling the recording layer 14 and $P_e$ to be the erase power of the laser beam shined when crystallizing the recording layer 14, they have the following relationship:

$$P_w > P_e > P_b.$$

Accordingly, when recording data to the optical recording medium 1, the controller 4 controls the laser driving circuit 5 via the laser control circuit 9 so that the power of the laser beam assumes the values $P_w$, $P_e$ and $P_b$ based on the recording condition setting information read from the optical recording medium 1, and the laser driving circuit 5 controls the power of the laser driving signal based thereupon. For example, the laser beam power levels $P_w$, $P_e$ and $P_b$ may be set to 6.0 mW, 2.8 mW and 0.1 mW, respectively.

In the information recording method according to this preferred embodiment, the (1,7) RLL modulation scheme is adopted. However, the application of the information recording method according to the present invention is not limited to the case in which this modulation scheme is used, but rather it is naturally applicable to cases in which another modulation scheme is used. Note that in this specification, the method of shining the laser beam in order to form a recording mark, namely the number of pulses in the laser beam, pulse width of each pulse, pulse interval, pulse power and other settings are collectively called the "pulse train pattern." Note that the pulse train pattern is also called the "recording strategy."

In addition, the recording condition setting information incorporated into the optical recording medium 1 contains content for determining which pulse train pattern should be used to record data, so the information recording apparatus shown in FIG. 1 performs the recording of data with the pulse train pattern to be described in detail below based on this determination.

Here, in the information recording method according to this preferred embodiment, the cooling interval when forming a recording mark with a length corresponding to the shortest recording mark which is 2T is set shorter than the cooling interval when forming the recording marks with a length corresponding to 3 T to 8T.

In addition, in the information recording method according to this preferred embodiment, the pulse interval is set substantially constant in the formation of all recording marks wherein the number of pulses used is 2 or greater (4T to 8T). Here follows a detailed description of the information recording method according to this preferred embodiment.

Figure 3:
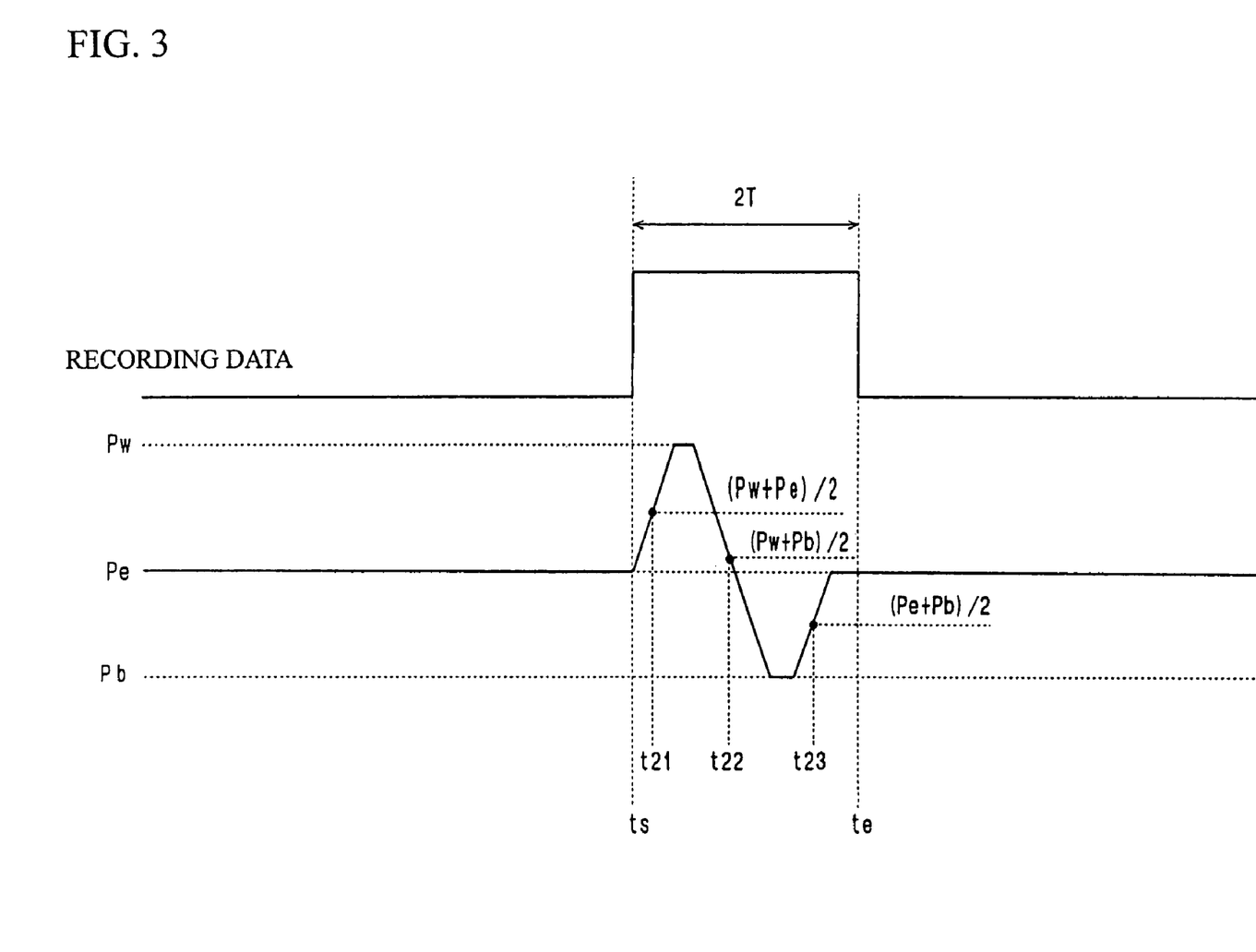
FIG. 3 is a drawing illustrating the pulse train pattern in the case of forming a recording mark of a length corresponding to 2T.

FIG. 3 is a drawing illustrating the pulse train pattern in the case of forming a recording mark of a length corresponding to 2T.

As shown in FIG. 3, when forming a recording mark of a length corresponding to 2T, the number of pulses in the laser beam is set to 1. Here, the number of pulses in the laser beam is defined by the number of times the power of the laser beam shined during recording is raised to $P_w$. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{21}$ to time $t_{22}$ shown on FIG. 3 is defined to be $T_{top(2T)}$ and the interval from time $t_{22}$ to time $t_{23}$ is defined to be $T_{cl(2T)}$, the specific values of $T_{top(2T)}$ and $T_{cl(2T)}$ are given below. As shown in FIG. 3, the time $t_{21}$ is the timing at which the laser beam power exceeds $(P_w+P_e)/2$, the time $t_{22}$ is the timing at which the laser beam power drops below $(P_w+P_b)/2$, and the time $t_{23}$ is the timing at which the laser beam power exceeds $(P_e+P_b)/2$.

During the interval $T_{top(2T)}$ (the heating interval), the recording layer 14 of the optical recording medium 1 receives a large amount of energy and its temperature exceeds the melting point, and during the interval $T_{cl(2T)}$ (the cooling interval), the recording layer 14 of the optical recording medium 1 is rapidly cooled. Thereby, a recording mark of a length corresponding to 2T is formed in the recording layer 14 of the optical recording medium 1.

Figure 4:
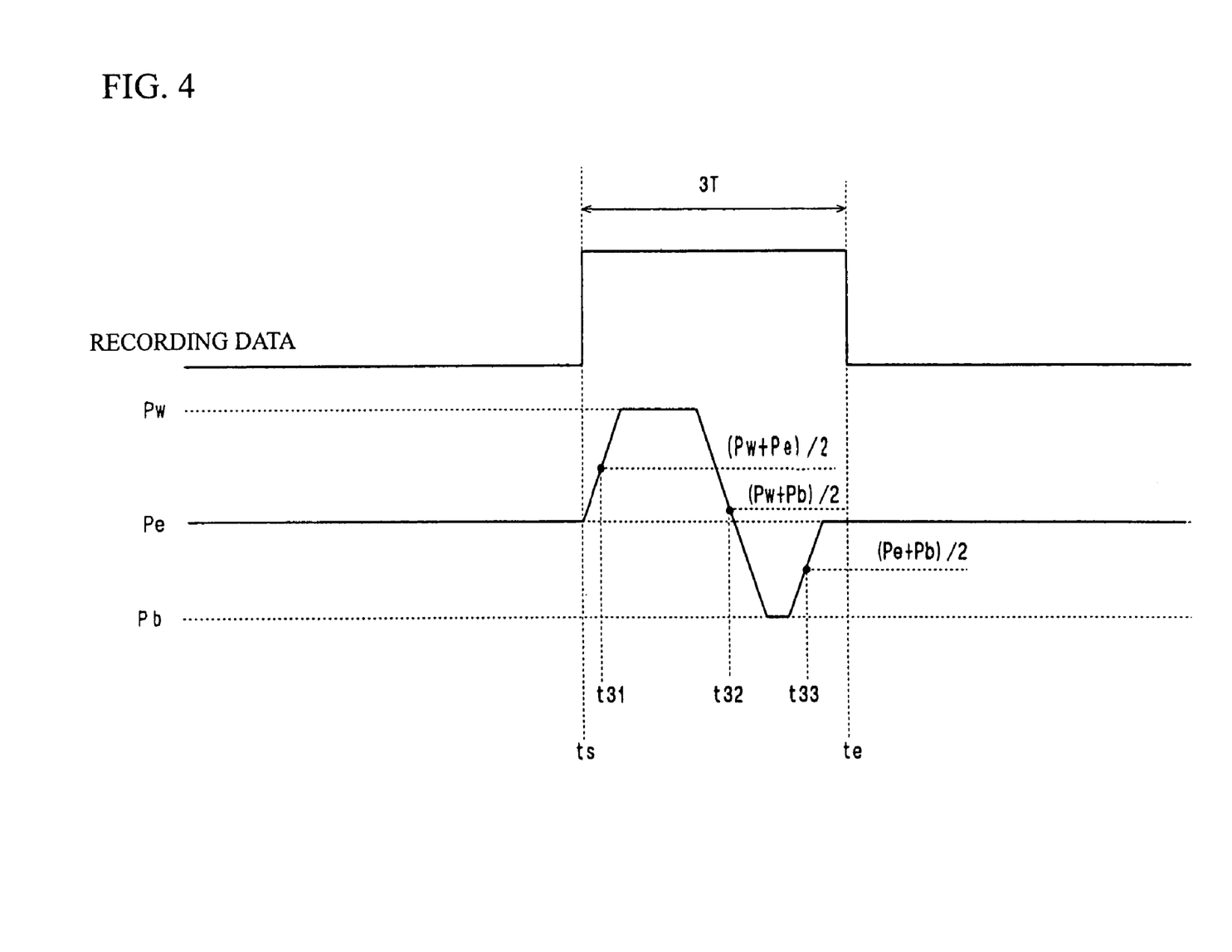
FIG. 4 is a drawing illustrating the pulse train pattern in the case of forming a recording mark of a length corresponding to 3 T.

FIG. 4 is a drawing illustrating the pulse train pattern in the case of forming a recording mark of a length corresponding to 3T.

As shown in FIG. 4, when forming a recording mark of a length corresponding to 3T also, the number of pulses in the laser beam is set to 1. More specifically, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{31}$ to time $t_{32}$ shown on FIG. 4 is defined to be $T_{top(3T)}$ and the interval from time $t_{32}$ to time $t_{33}$ is defined to be $T_{cl(3T)}$, $T_{top(3T)}$ is set to ~1.3T and $T_{cl(3T)}$ is set to ~0.7T. As shown in FIG. 4, the time $t_{31}$ is the timing at which the laser beam power exceeds $(P_w+P_e)/2$, the time $t_{32}$ is the timing at which the laser beam power drops below $(P_w+P_b)/2$, and the time $t_{33}$ is the timing at which the laser beam power exceeds $(P_e+P_b)/2$.

During the interval $T_{top(3T)}$ (the heating interval), the recording layer 14 of the optical recording medium 1 receives a large amount of energy and its temperature exceeds the melting point, and during the interval $T_{cl(3T)}$ (the cooling interval), the recording layer 14 of the optical recording medium 1 is rapidly cooled. Thereby, a recording mark of a length corresponding to 3T is formed in the recording layer 14 of the optical recording medium 1.

Figure 5:
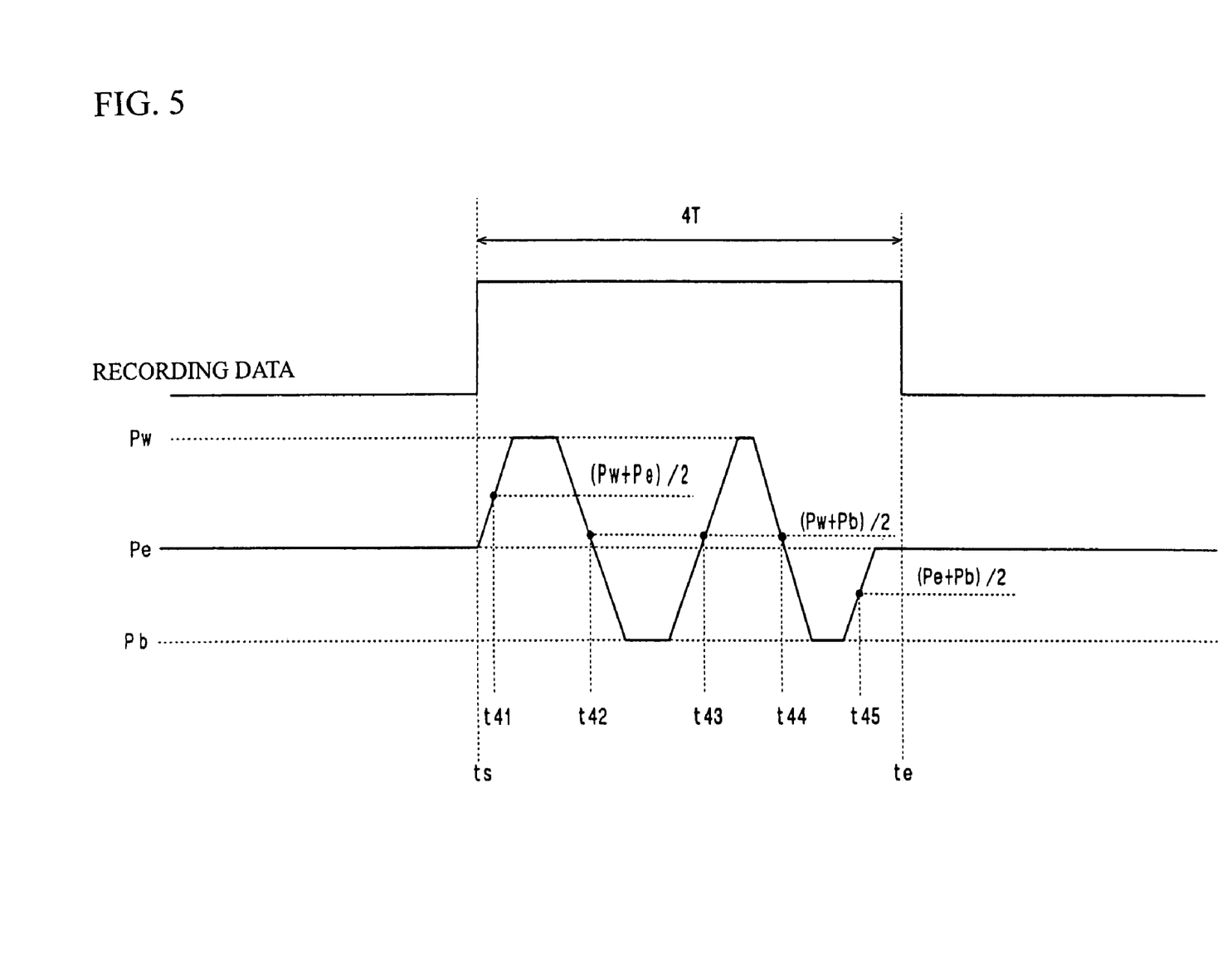
FIG. 5 is a drawing illustrating the pulse train pattern in the case of forming a recording mark of a length corresponding to 4T.

FIG. 5 is a drawing illustrating the pulse train pattern in the case of forming a recording mark of a length corresponding to 4T.

As shown in FIG. 5, when forming a recording mark of a length corresponding to 4T also, the number of pulses in the laser beam is set to 2. More specifically, during the period from the time $t_s$ to the time $t_e$, the set consisting of the combination of the laser beam power being first set to $P_w$ and then being set to the power $P_b$ is repeated twice. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{41}$ to time $t_{42}$ shown on FIG. 5 is defined to be $T_{top(4T)}$, the interval from time $t_{42}$ to time $t_{43}$ is defined to be $T_{off(4T)}$, the interval from time $t_{43}$ to time $t_{44}$ is defined to be $T_{last(4T)}$, and the interval from time $t_{44}$ to time $t_{45}$ is defined to be $T_{cl(4T)}$, $T_{top(4T)}$ is set to ~1.0T, $T_{off(4T)}$ is set to ~1.0T, $T_{last(4T)}$ is set to 0.7T, and $T_{cl(4T)}$ is set to ~0.7T. As shown in FIG. 5, the time $t_{41}$ is the timing at which the laser beam power exceeds $(P_w+P_e)/2$, the times $t_{42}$ and $t_{44}$ are the timing at which the laser beam power drops below $(P_w+P_b)/2$, the time $t_{43}$ is the timing at which the laser beam power exceeds $(P_w+P_b)/2$, and the time $t_{45}$ is the timing at which the laser beam power exceeds $(P_e+P_b)/2$.

During the intervals $T_{top(4T)}$, $T_{off(4T)}$, and $T_{last(4T)}$ (the heating intervals), the recording layer 14 of the optical recording medium 1 receives a large amount of energy and its temperature exceeds the melting point, and during the interval $T_{cl(4T)}$ (the cooling interval) the recording layer 14 of the optical recording medium 1 is rapidly cooled. Thereby, a recording mark of a length corresponding to 4T is formed in the recording layer 14 of the optical recording medium 1.

Figure 6:
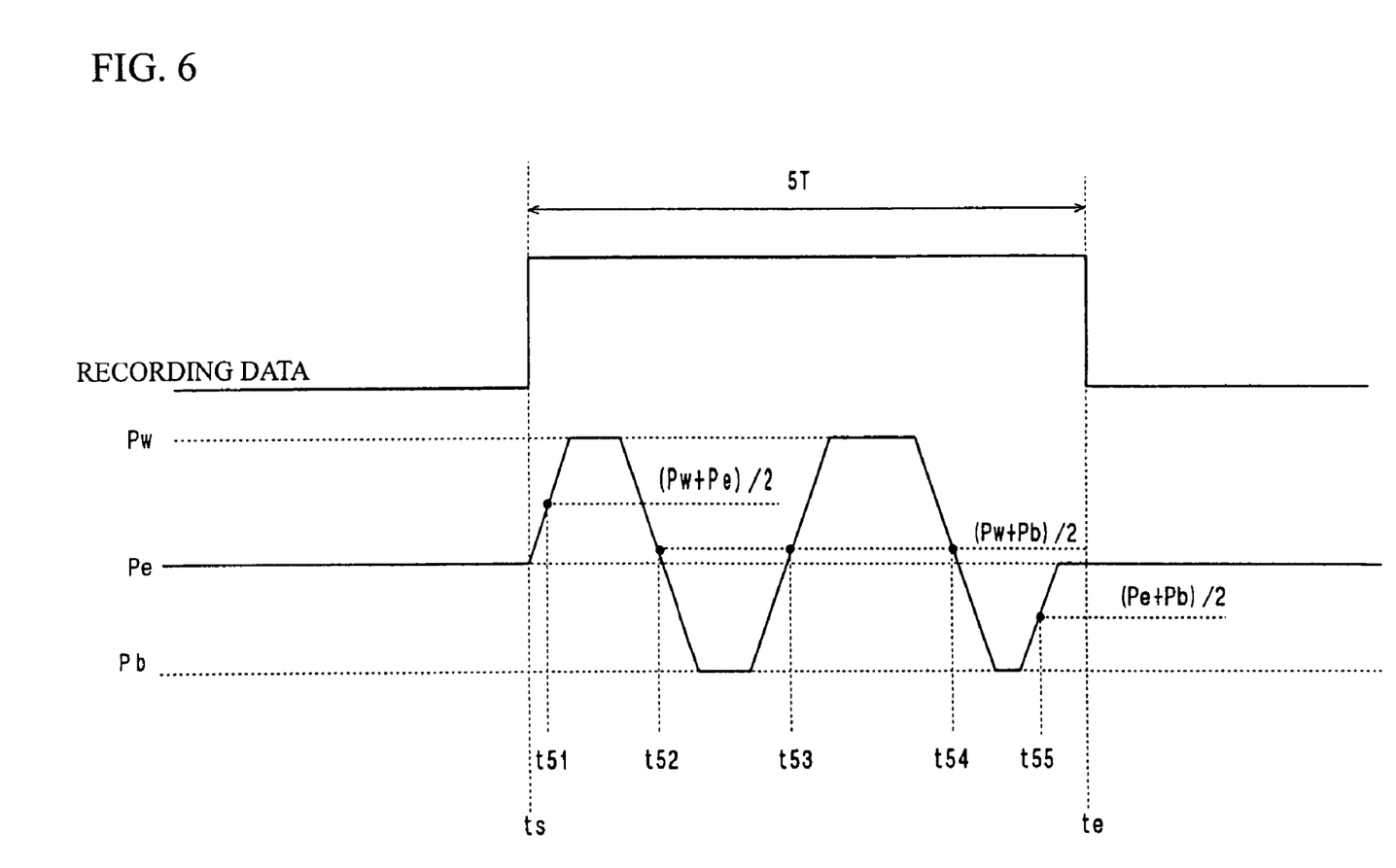
FIG. 6 is a drawing illustrating the pulse train pattern in the case of forming a recording mark of a length corresponding to 5 T.

FIG. 6 is a drawing illustrating the pulse train pattern in the case of forming a recording mark of a length corresponding to 5T.

As shown in FIG. 6, when forming a recording mark of a length corresponding to 5T also, the number of pulses in the laser beam is set to 2. More specifically, during the period from the time $t_s$ to the time $t_e$, the set consisting of the combination of the laser beam power being first set to $P_w$ and then being set to the power $P_b$ is repeated twice. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{51}$ to time $t_{52}$ shown on FIG. 6 is defined to be $T_{top(5T)}$, the interval from time $t_{52}$ to time $t_{53}$ is defined to be $T_{off(5T)}$, the interval from time $t_{53}$ to time $t_{54}$ is defined to be $T_{last(5T)}$, and the interval from time $t_{54}$ to time $t_{55}$ is defined to be $T_{cl(5T)}$, $T_{top(5T)}$ is set to ~1.0T, $T_{oss(5T)}$ is set to ~1.0T, $T_{last(5T)}$ is set to ~1.3T, and $T_{cl(5T)}$ is set to ~0.7T. As shown in FIG. 6, the time $t_{51}$ is the timing at which the laser beam power exceeds $(P_w+P_e)/2$, the times $t_{52}$ and $t_{54}$ are the timing at which the laser beam power drops below $(P_w+P_b)/2$, the time $t_{53}$ is the timing at which the laser beam power exceeds $(P_w+P_b)/2$, and the time $t_{55}$ is the timing at which the laser beam power exceeds $(P_e+P_b)/2$.

During the intervals $T_{top(5T)}$, $T_{off(5T)}$, and $T_{last(5T)}$ (the heating intervals), the recording layer 14 of the optical recording medium 1 receives a large amount of energy and its temperature exceeds the melting point, and during the interval $T_{cl(5T)}$ (the cooling interval) the recording layer 14 of the optical recording medium 1 is rapidly cooled. Thereby, a recording mark of a length corresponding to 5T is formed in the recording layer 14 of the optical recording medium 1.

Figure 7:
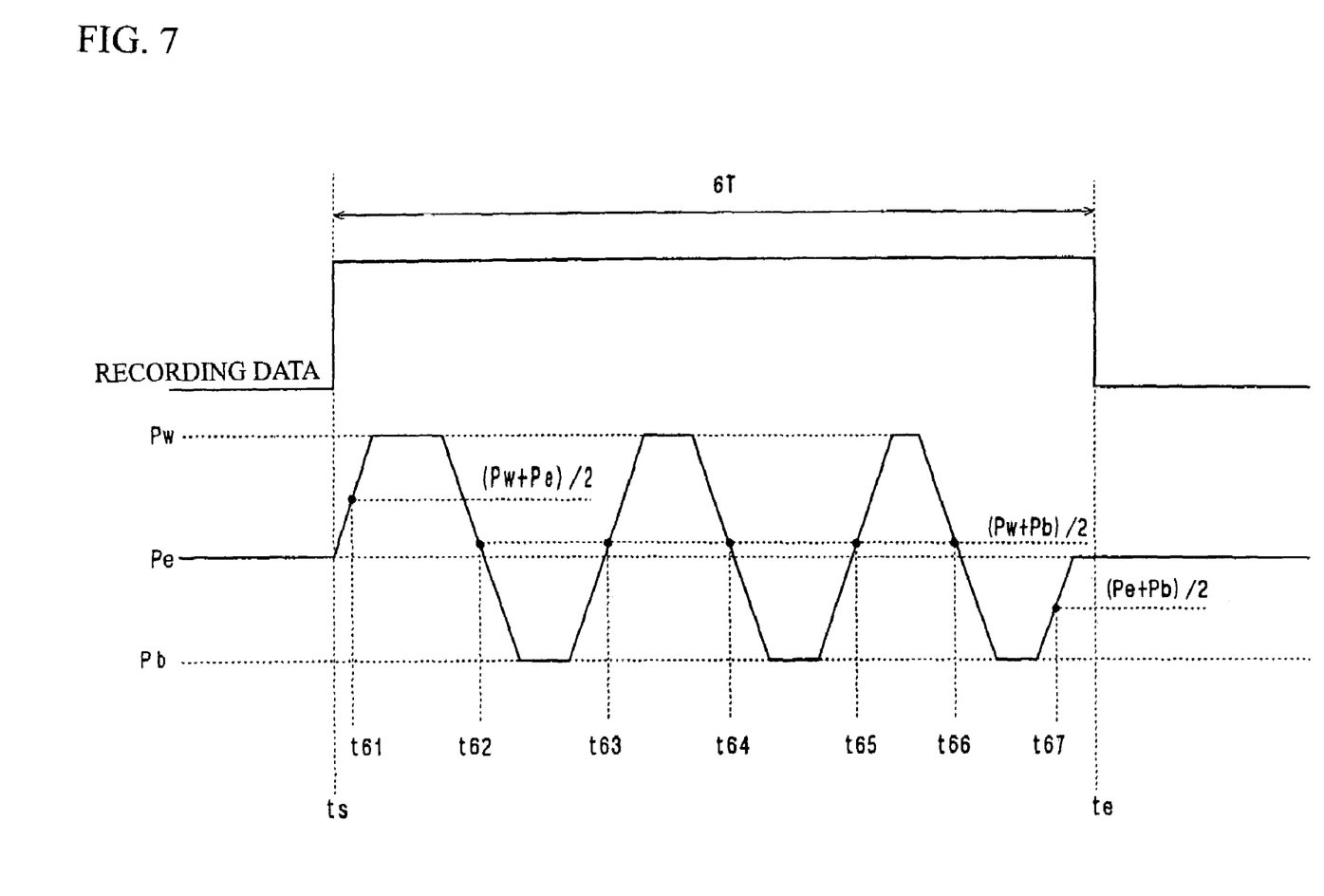
FIG. 7 is a drawing illustrating the pulse train pattern in the case of forming a recording mark of a length corresponding to 6T.

FIG. 7 is a drawing illustrating the pulse train pattern in the case of forming a recording mark of a length corresponding to 6T.

As shown in FIG. 7, when forming a recording mark of a length corresponding to 6T also, the number of pulses in the laser beam is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{61}$ to time $t_{62}$ shown on FIG. 7 is defined to be $T_{top(6T)}$, the interval from time $t_{62}$ to time $t_{63}$ is defined to be $T_{off(6T-1)}$, the interval from time $t_{63}$ to time $t_{64}$ is defined to be $T_{mp(6T)}$, the interval from time $t_{64}$ to time $t_{65}$ is defined to be $T_{off(6T-2)}$, the interval from time $t_{65}$ to time $t_{66}$ is defined to be $T_{last(6T)}$, and the interval from time $t_{66}$ to time $t_{67}$ is defined to be $T_{cl(6T)}$, $T_{top(6T)}$ is set to ~1.0T, $T_{off(6T-1)}$ is set to ~1.0T $T_{mp(6T)}$ is set to ~1.0T, $T_{off(6T-2)}$ is set to ~1.0T, $T_{last(6T)}$ is set to ~0.7T, and $T_{cl(6T)}$ is set to ~0.7T. As shown in FIG. 7, the time $t_{61}$ is the timing at which the laser beam power exceeds $(P_w+P_e)/2$, the times $t_{62}$, $t_{64}$ and $t_{66}$ are the timing at which the laser beam power drops below $(P_w+P_b)/2$, the times $t_{63}$ and $t_{65}$ are the timing at which the laser beam power exceeds $(P_w+P_b)/2$, and the time $t_{67}$ is the timing at which the laser beam power exceeds $(P_e+P_b)/2$.

During the intervals $T_{top(6T)}$, $T_{off(6T-1)}$, $T_{mp(6T)}$, $T_{off(6T-2)}$, and $T_{last(6T)}$ (the heating intervals), the recording layer 14 of the optical recording medium 1 receives a large amount of energy and its temperature exceeds the melting point, and during the interval $T_{cl(6T)}$ (the cooling interval), the recording layer 14 of the optical recording medium 1 is rapidly cooled. Thereby, a recording mark of a length corresponding to 6T is formed in the recording layer 14 of the optical recording medium 1.

Figure 8:
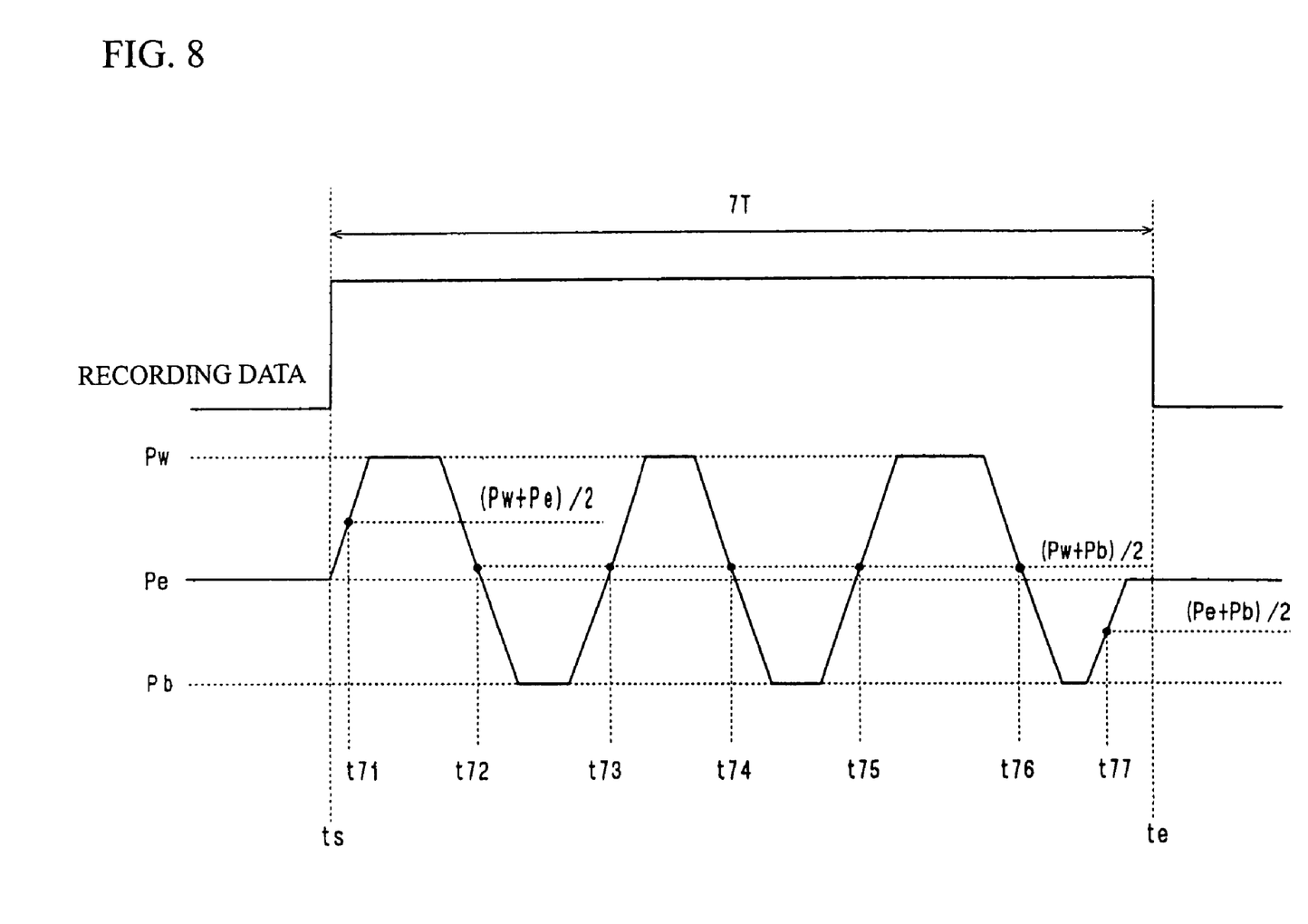
FIG. 8 is a drawing illustrating the pulse train pattern in the case of forming a recording mark of a length corresponding to 7T.

FIG. 8 is a drawing illustrating the pulse train pattern in the case of forming a recording mark of a length corresponding to 7T.

As shown in FIG. 8, when forming a recording mark of a length corresponding to 7T, the number of pulses in the laser beam is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_s$ is set to $P_e$ or $P_b$.

Here, when the interval from time $t_{71}$ to time $t_{72}$ shown on FIG. 8 is defined to be $T_{top(7T)}$, the interval from time $t_{72}$ to time $t_{73}$ is defined to be $T_{off(7T-1)}$, the interval from time $t_{73}$ to time $t_{74}$ is defined to be $T_{mp(7T)}$, the interval from time $t_{74}$ to time $t_{75}$ is defined to be $T_{off(7T-2)}$, the interval from time $t_{75}$ to time $t_{76}$ is defined to be $T_{last(7T)}$, and the interval from time $t_{76}$ to time $t_{77}$ is defined to be $T_{cl(7T)}$, $T_{top(7T)}$ is set to ~1.0T, $T_{off(7T-1)}$ is set to ~1.0T, $T_{mp(7T)}$, is set to ~1.0T, $T_{off(7T-2)}$ is set to ~1.0T, $T_{last(7T)}$ is set to ~1.3T, and $T_{cl(7T)}$ is set to ~0.7T. As shown in FIG. 8, the time $t_{71}$ is the timing at which the laser beam power exceeds $(P_w+P_e)/2$, the times $t_{72}$, $t_{74}$ and $t_{76}$ are the timing at which the laser beam power drops below $(P_w+P_b)/2$, the times $t_{73}$ and $t_{75}$ are the timing at which the laser beam power exceeds $(P_w+P_b)/2$, and the time $t_{77}$ is the timing at which the laser beam power exceeds $(P_e+P_b)/2$.

During the intervals $T_{top(7T)}$, $T_{off(7T-1)}$, $T_{mp(7T)}$, $T_{off(7T-2)}$, and $T_{last(7T)}$ (the heating intervals), the recording layer 14 of the optical recording medium 1 receives a large amount of energy and its temperature exceeds the melting point, and during the interval $T_{cl(7T)}$ (the cooling interval), the recording layer 14 of the optical recording medium 1 is rapidly cooled. Thereby, a recording mark of a length corresponding to 7T is formed in the recording layer 14 of the optical recording medium 1.

Figure 9:
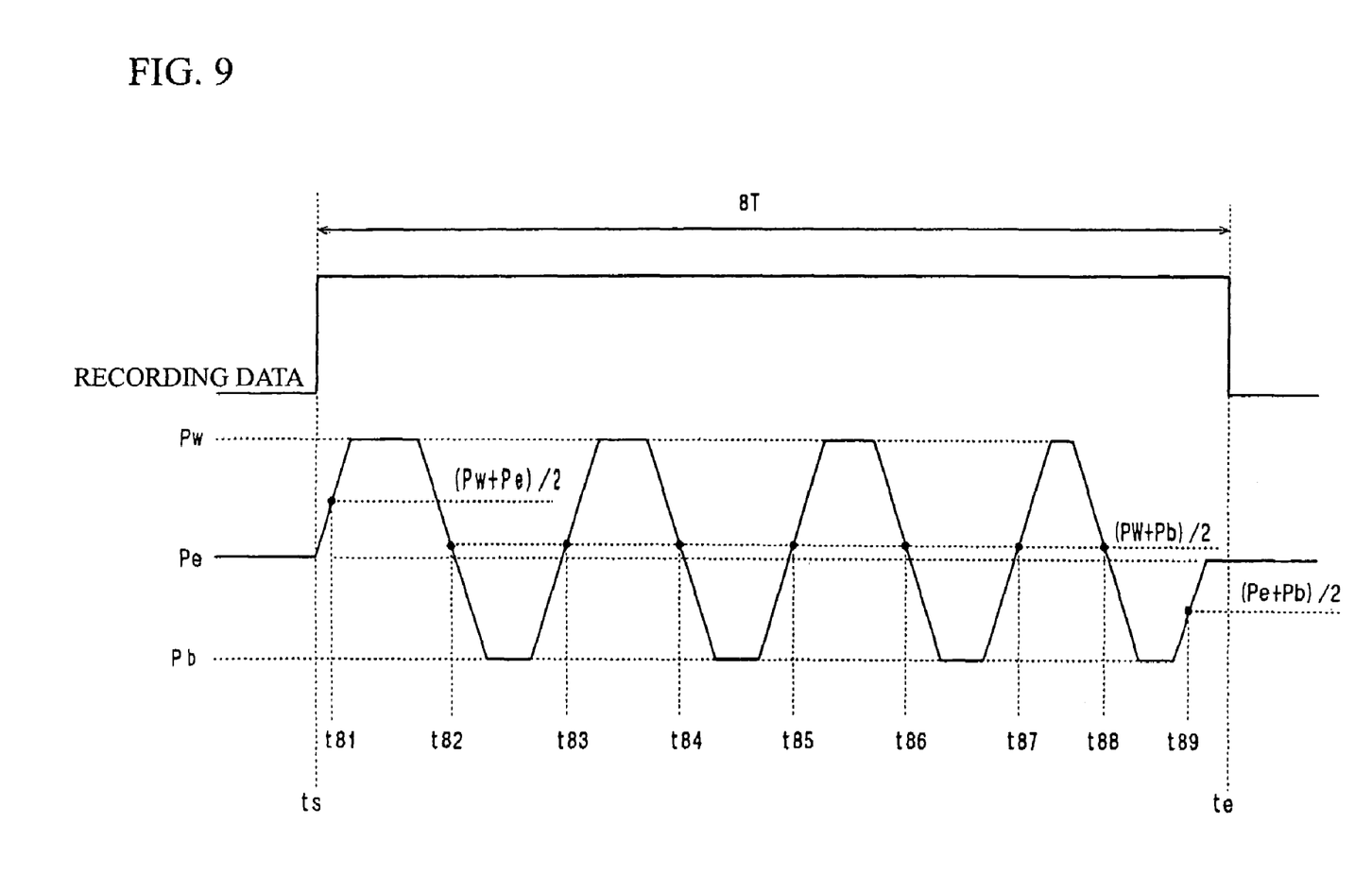
FIG. 9 is a drawing illustrating the pulse train pattern in the case of forming a recording mark of a length corresponding to 8 T.

FIG. 9 is a drawing illustrating the pulse train pattern in the case of forming a recording mark of a length corresponding to 8T.

As shown in FIG. 9, when forming a recording mark of a length corresponding to 8T also, the number of pulses in the laser beam is set to 4. More specifically, during the period from the time $t_s$ to the time $t_e$, the set consisting of the combination of the laser beam power being first set to $P_w$ and then being set to the power $P_b$ is repeated four times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{81}$ to time $t_{82}$ shown on FIG. 9 is defined to be $T_{top(8T)}$, the interval from time $t_{82}$ to time $t_{83}$ is defined to be $T_{off(8T-1)}$, the interval from time $t_{83}$ to time $t_{84}$ is defined to be $T_{mp(8T-1)}$, the interval from time $t_{84}$ to time $t_{85}$ is defined to be $T_{off(8T-2)}$, the interval from time $t_{85}$ to time $t_{86}$ is defined to be $T_{mp(8T-2)}$ the interval from time $t_{86}$ to time $t_{87}$ is defined to be $T_{off(8T-3)}$, the interval from time $t_{87}$ to time $t_{88}$ is defined to be $T_{last(8T)}$, and the interval from time $t_{88}$ to time $t_{89}$ is defined to be $T_{cl(8T)}$, $T_{top(8T)}$ is set to ~1.0T, $T_{off(8T-1)}$ is set to ~1.0T, $T_{off(8T-2)}$ is set to ~1.0T, $T_{mp(8T-2)}$ is set to ~1.0T, $T_{off(8T-3)}$ is set to ~1.0T, $T_{last\ (8T)}$ is set to ~0.7T, and $T_{cl(8T)}$ is set to ~0.7T. As shown in FIG. 9, the time $t_{81}$ is the timing at which the laser beam power exceeds $(P_w+P_e)/2$, the times $t_{82}$, $t_{84}$, $t_{86}$ and $t_{88}$ are the timing at which the laser beam power drops below $(P_w+P_b)/2$, the times $t_{83}$, $t_{85}$ and $t_{87}$ are the timing at which the laser beam power exceeds $(P_w+P_b)/2$, and the time $t_{89}$ is the timing at which the laser beam power exceeds $(P_e+P_b)/2$.

During the intervals $T_{top(8T)}$, $T_{off(8T-1)}$, $T_{mp(8T-1)}$, $T_{off(8T-2)}$, $T_{mp(8T-2)}$, $T_{off(8T-3)}$, and $T_{last(8T)}$ (the heating intervals), the recording layer 14 of the optical recording medium 1 receives a large amount of energy and its temperature exceeds the melting point, and during the interval $T_{cl(8T)}$ (the cooling interval), the recording layer 14 of the optical recording medium 1 is rapidly cooled. Thereby, a recording mark of a length corresponding to 8T is formed in the recording layer 14 of the optical recording medium 1.

Here follows a description of the erase efficiency when overwriting already formed recording marks with the pulse train pattern described above. Here, the "erase efficiency" is defined to be the decrease in the carrier of a single signal recorded previously in the case that the single signal consisting of stipulated recording marks is continuously recorded and then continuously overwritten once with another single signal consisting of recording marks different from the recording marks described above, so if this is low the jitter is higher. Specifically, an erase efficiency of 30 dB or greater is required in order to achieve a good overwrite.

Table 1 presents the erase efficiency in the case that the laser beam wavelength λ is set to 405 mm, the lens numerical aperture (NA) is set to 0.85, the recording linear speed is set to 22.8 nm/s, the clock frequency is set to 262.5 MHz, and the (1,7) RLL modulation scheme is adopted to overwrite recording marks of a length corresponding to 7T with recording marks of lengths corresponding to 2T, 3T, 4T, 5T, 6T, and 8T. Under these conditions, the data transfer rate becomes 140 Mbps, taking into account a format efficiency of 80%. Here, in the formation of recording marks of a length corresponding to 2T, $T_{top(2T)}$ is set to ~0.6T and $T_{cl(2T)}$ is set to ~0.7T. In other words, $T_{cl(2T)}$ is set to the same length as in $T_{cl(3T)}$ through $T_{cl(8T)}$. In addition, the method of forming recording marks of lengths corresponding to 3T, 4T, 5T, 6T and 8T is described below.

TABLE 1

| Overwritten recording mark | Erase efficiency |
|---|---|
| 2T | 27.1 dB |
| 3T | 36.6 dB |
| 4T | 33.7 dB |
| 5T | 35.1 dB |
| 6T | 34.4 dB |
| 8T | 34.0 dB |

As is evident from Table 1, in the case that recording marks of a length corresponding to the shortest recording mark 2T are overwritten, the erase efficiency drops. This is thought to be because $T_{top(2T)}$ is set extremely short, so the recording layer 14 of the optical recording medium 1 is already adequately cooled in the middle of the interval $T_{top(2T)}$. If the recording layer 14 of the optical recording medium 1 is adequately cooled in the middle of the interval $T_{top(2T)}$, then the old recording marks are not erased during the subsequent interval until the laser beam power becomes $P_e$, thus giving rise to a drop in the erase efficiency.

Table 2 presents the erase efficiency in the case of overwriting recording marks of a length corresponding to 7T with recording marks of lengths corresponding to 2T under different conditions.

TABLE 2

| $T_{top(2T)}$ | $T_{cl(2T)}$ | Erase efficiency |
|---|---|---|
| 0.6T | 0.7T | 27.1 dB |
| 0.7T | 0.5T | 30.3 dB |
| 0.8T | 0.3T | 32.7 dB |
| 0.9T | 0.2T | 32.3 dB |

As is evident from Table 2, one can see that in the formation of recording marks of a length corresponding to the shortest recording mark 2T when $T_{cl(2T)}$ is shortened to 0.5T (shortened to approximately 71% of the other $T_{cl}$ values), the erase efficiency is improved but when shortened to 0.3T (shortened to approximately 43% of the other $T_{cl}$ values), the erase efficiency is improved even more.

From the above, one can see that in the formation of recording marks of a length corresponding to the shortest recording mark 2T by setting the value of $T_{cl(2T)}$ which stipulates the cooling interval to shorter than the cooling interval when forming other recording marks, the erase efficiency can be greatly increased. Specifically, if $T_{top(2T)}$ is set to approximately 0.7–0.8T and $T_{cl(2T)}$ is set to approximately 0.3–0.51T good erase characteristics can be obtained.

In this manner, with the present embodiment, the cooling interval $T_{cl(2T)}$ used in the formation of recording marks of a length corresponding to the shortest recording mark 2T is set shorter than the cooling interval when forming other recording marks, so if the format efficiency is 80%, even if the clock frequency is set extremely short in order to achieve a data transfer rate of 100 Mbps or greater, or in particular a data transfer rate of 140 Mbps or greater, it is possible to obtain good erase characteristics when overwriting recording marks.

The present invention is in no way limited to the aforementioned embodiment, but rather various modifications are possible within the scope of the invention as recited in the claims, and these are naturally included within the scope of the invention.

For example, in the preferred embodiment above, only the cooling interval $T_{cl(2T)}$ at the time of formation of recording marks of a length corresponding to the shortest recording mark 2T is set shorter than the cooling interval when forming other recording marks, but the recording marks for which the cooling interval can be set shorter is not limited to recording marks of a length corresponding to 2T, but rather, for example, the cooling interval for recording marks of a length corresponding to 3T may also be set shorter than the cooling interval when forming other recording marks, along with the recording marks of a length corresponding to 2T or instead of the recording marks of a length corresponding to 2T. In addition, the cooling interval at the time of mark formation may also be set in a stepwise manner to be longer the shorter the length of the recording mark.

In addition, in the preferred embodiment above, the number of pulses of the laser beam was set to 1, 1, 2, 2, 3, 3 and 4 when forming recording marks with lengths corresponding to 2T, 3T, 4T, 5T, 6T, 7T and 8T, respectively, but the pulse train pattern according to the present invention is not limited thereto, but rather a different pulse train pattern may be adopted.

In addition, while the optical recording medium 1 shown in FIG. 2 is given as an example of a suitable optical recording medium for the application of the method of recording information to an optical recording medium according to the present embodiment, the information recording method according to the present invention is not limited in being applicable only to this optical recording medium, but rather it is applicable to any kind of optical recording medium as long as it is a recordable optical recording medium.

Moreover, in the aforementioned preferred embodiment, the power of the laser beam shined during recording is set to the three levels of $P_w$, $P_e$ and $P_b$, but it may also be set to two levels. For example, in the aforementioned preferred embodiment, the laser beam power $P_e$ is set higher than the laser beam power $P_b$ but they may also be set to the same power level. In addition, the power of the laser beam shined during recording may also be set to four or more levels.

As described above, the present invention can provide an optical recording medium, a method of recording information to an optical recording medium and an information recording apparatus that is suited to achieving high data transfer rates.

The invention claimed is:

1. An optical recording medium comprising:
at least a recording layer where information is recorded by directly overwriting a plurality of already-formed marks with a plurality of recording marks selected from a group consisting of several types of recording marks each with different lengths;
setting information required to perform the recording of said plurality of recording marks with a cooling intervals, wherein the setting information has information to set the shortest recording mark contained within said group of recording marks shorter than the cooling interval of the other recording marks; and
a clock frequency set so that a data transfer rate of 100 Mbps or greater can be achieved, taking into account a format efficiency of 80%.

2. An optical recording medium in accordance with claim 1, further comprising setting information required to perform the recording of said information with the cooling interval when forming said other recording marks set to be substantially constant for each recording mark.

3. A method of recording information to an optical recording medium where information is recorded by forming a plurality of recording marks selected from a group consisting of several types of recording marks each with different lengths, wherein:
the cooling interval when directly overwriting a record mark with a shortest recording mark contained within said group is set shorter than the cooling interval when directly overwriting the recordin mark with the other recording marks contained in said group in the case where a clock frequency is set so that a data transfer rate of 100 Mbps or greater can be achieved, taking into account a format efficiency of 80%.

4. A method of recording information to an optical recording medium in accordance with claim 3, wherein the heating interval when forming said shortest recording mark is set shorter than the heating interval when forming said other recording marks.

5. A method of recording information to an optical recording medium in accordance with claim 4, wherein said cooling interval when forming the other recording marks is set to be substantially constant for each recording mark.

6. A method of recording information to an optical recording medium in accordance with claim 4 wherein the pulse interval is set substantially constant in the formation of all recording marks wherein the number of pulses used is 2 or greater.

7. A method of recording information to an optical recording medium in accordance with claim 3, wherein said cooling interval when forming the other recording marks is set to be substantially constant for each recording mark.

8. A method of recording information to an optical recording medium in accordance with claim 7, wherein the pulse interval is set substantially constant in the formation of all recording marks wherein the number of pulses used is 2 or greater.

9. A method of recording information to an optical recording medium in accordance with claim 7, wherein the pulse interval is set substantially constant in the formation of all recording marks wherein the number of pulses used is 2 or greater.

10. A method of recording information to an optical recording medium in accordance with claim 3, wherein the pulse interval is set substantially constant in the formation of all recording marks wherein the number of pulses used is 2 or greater.

11. An information recording apparatus that records information by forming on the optical recording medium a plurality of recording marks selected from a group consisting of several types of recording marks with different lengths, wherein said information recording apparatus comprises:
a means for directly overwriting an already-formed record mark with a shortest recording mark contained in said group by setting the length of the cooling interval to a first time;

a means of for directly overwriting the already-formed record mark with the other recording marks contained in said group by setting the length of the cooling interval to a second time longer than said first time; and a means for setting a clock frequency to achieve a data transfer rate of 100 Mbps or greater, taking into account a format efficiency of 80%.

12. A method of recording information to an optical recording medium, comprising:

directly writing at least one first recording mark with a first length over at least one first already-formed recorded mark, the writing concluding with a cooling interval of a first time; and directly writing a shortest recording mark with a second length that is less than the first length over a second already-formed recorded mark, the writing concluding with a cooling interval of a second time that is less than the first time.

13. The method of claim 12, further comprising:

directly writing the at least one first recording mark and the shortest recording mark with a clock frequency that supports a data transfer rate of at least 100 Mbps.

14. The method of claim 13, further comprising:

directly writing the at least one first recording mark and the shortest recording mark with a format efficiency of at least 80%.

* * * * *